No. 695,016. Patented Mar. 11, 1902.
H. M. WARE.
VALVE.
(Application filed Aug. 15, 1901.)
(No Model.)
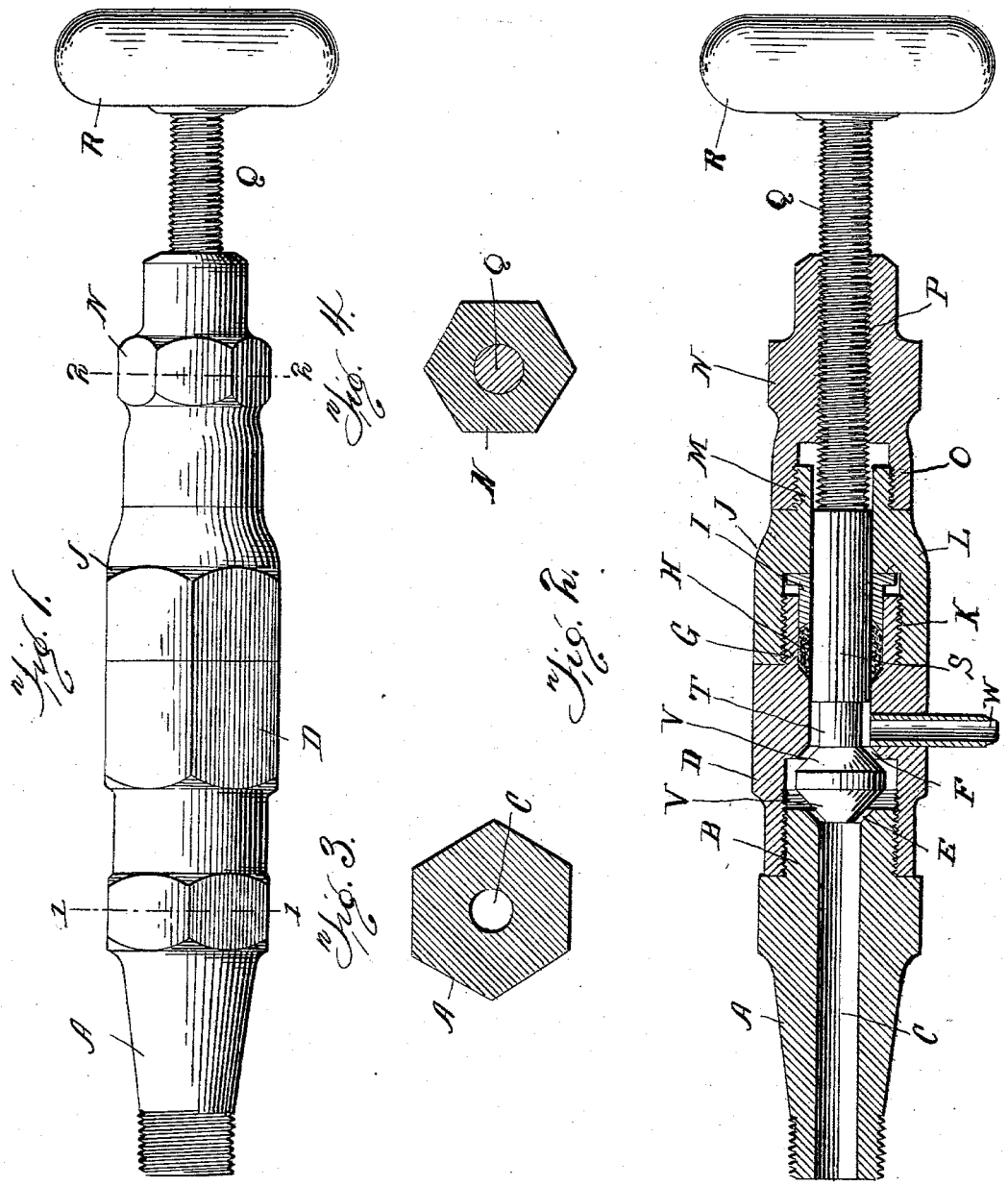

UNITED STATES PATENT OFFICE.

HENRY M. WARE, OF LEXINGTON, KENTUCKY.

VALVE.

SPECIFICATION forming part of Letters Patent No. 695,016, dated March 11, 1902.

Application filed August 15, 1901. Serial No. 72,104. (No model.)

*To all whom it may concern:*

Be it known that I, HENRY M. WARE, a citizen of the United States, residing at Lexington, in the county of Fayette and State of Kentucky, have invented new and useful Improvements in Valves, of which the following is a specification.

My invention relates to valves for use in connection with receptacles containing fluid under pressure, such as water, steam, air, &c.; and the object is the production of a valve which shall possess certain improved features of construction whereby a threaded nut-section thereof can be disconnected when it becomes necessary to regrind the valve proper or to remove any foreign substance which prevents the seating of the same and without removing the entire valve.

The invention consists in certain novelties of construction and combinations of parts hereinafter set forth and claimed.

Figure 1 is an exterior view of the entire valve. Fig. 2 is a longitudinal section showing the valve rod or stem in elevation. Fig. 3 is a section on line 1 1 of Fig. 1. Fig. 4 is a section on line 2 2 of Fig. 1.

Referring to the several views, the letter A designates the outer valve-seat section, having a tapering and threaded end. B is the opposite end of the section, reduced in diameter and threaded to form a hub; C, a central passage or bore; D, the inner valve-seat section bored out and threaded internally to fit over the hub B of the outer section; E, a beveled valve-seat; F, a beveled valve-seat on the interior of the inner section; G, an externally-threaded hub; H, packing of any suitable material; I, a gland with a flange; J, the packing-nut; K, the internally-threaded end of nut J, which fits the hub G of the inner section; L, a surface which bears against the flange of the gland; M, an externally-threaded hub; N, the threaded nut; O, an internally-threaded bore fitting over hub M, as shown; P, an internally-threaded passage of the nut; Q, the threaded valve rod or stem; R, a hand-wheel; S, the smooth portion of the rod which is engaged by the packing; T, a portion of the rod which is diminished in diameter, so as to form an open space between it and the inner surface of the passage through the section D, as shown; V, the double and oppositely-disposed conical or beveled surfaces of the end or head of the rod, which is enlarged and has free reciprocating motion in the space between the valve-seats, and W is an escape opening or pipe.

The operation is as follows: By rotating the hand-wheel to the right or left as the screw-threaded portion of the rod engages the threaded bore of the nut N the rod will be forced inwardly or outwardly and cause the conical surfaces V to frictionally engage the seat E or F. When the conical surfaces are midway of the seats, fluid under pressure can escape by way of the pipe W.

As is well known to those familiar with this class of devices, it frequently happens that the valve-seats or conical surfaces become worn or clogged with dirt, so that the fluid under pressure will escape. It has usually been the custom when leakage occurs to remove the entire valve and regrind the surfaces. This necessity is obviated by my invention, inasmuch as the threaded-nut section N can be unscrewed from the hub M and run up the threaded part of the rod, and when so detached the rod can be revolved and the dirt removed from between the conical surfaces and seats and the said surfaces and seats ground to a tight fit. This obviously can be accomplished without removing the entire valve from the receptacle containing the fluid under pressure and without disturbing the gland-packing, which is designedly located between the section D and the packing-nut.

What I claim as new, and desire to secure by Letters Patent, is—

1. A valve or cock comprising a valve-seat section having a valve-seat, an inner section, a packing-nut, a packing, a threaded nut N having an internally-threaded passage, a threaded valve rod or stem, and an escape opening or pipe in the inner section; the said stem being provided at its end with a conical surface to engage the valve-seat.

2. A valve or cock comprising a threaded end section, an inner section having a valve-seat, a packing-nut, a packing, a threaded nut having an internally-threaded passage, a threaded rod or stem, and an escape opening or pipe; the said stem being provided at its end with a beveled surface to engage the valve-seat.

3. A valve or cock embracing a section having a valve-seat, a packing-nut, a packing adapted to be compressed by the packing-nut, a threaded nut N which is internally threaded and adapted to be detached from the packing-nut, a threaded valve-stem provided with a beveled surface to fit the valve-seat, and an escape opening or pipe in the inner section.

4. A valve or cock having a valve-seat, a threaded stem or rod provided with a surface to fit the seat, a section D, a packing, a packing-nut J, and a threaded nut N engaging the threaded stem and detachably secured to the packing-nut, said packing being located between the packing-nut and the section D, as set forth.

5. A valve or cock consisting of threaded sections A, D, J, and N detachably secured together end to end, and one of said sections having a valve-seat; a threaded valve-stem Q provided with a bearing to fit the seat in one of the sections, the threaded nut N being adjustable on the said stem; an escape-pipe; and a packing located between the nut N and the valve-seat and surrounding the smooth portion of the rod.

6. A valve or cock having a valve-seat, a section A, a section D, a section J, a threaded valve-stem provided with a bearing-surface for engaging the seat, an internally-screw-threaded nut which can be detached from another section of the valve and run upwardly upon the valve-stem, and a stationary packing and packing-gland I located between the valve-seat and the threaded nut.

7. A valve or cock having a section A, a section D detachably secured to section A, a section J secured to section D, a valve-seat, a threaded valve-stem, a packing H and packing-gland located above the valve-seat and surrounding the valve-stem, and a detachable threaded nut N which can be run up on the stem and revolved with the same, said sections and nut being arranged in line, and said valve-stem having a bearing at the end engaging the seat; whereby the valve can be ground to its seat without the removal of the same from the receptacle containing fluid under pressure.

In testimony whereof I affix my signature in presence of two witnesses.

HENRY M. WARE.

Witnesses:
PAUL W. SCOTT,
H. T. LOVETT.